S. M. LILLIE.
PROCESS OF CONVERTING STARCH INTO DERIVATIVES, DEXTRIN, DEXTROSE, &c.
APPLICATION FILED JAN. 14, 1910.
959,237.
Patented May 24, 1910.
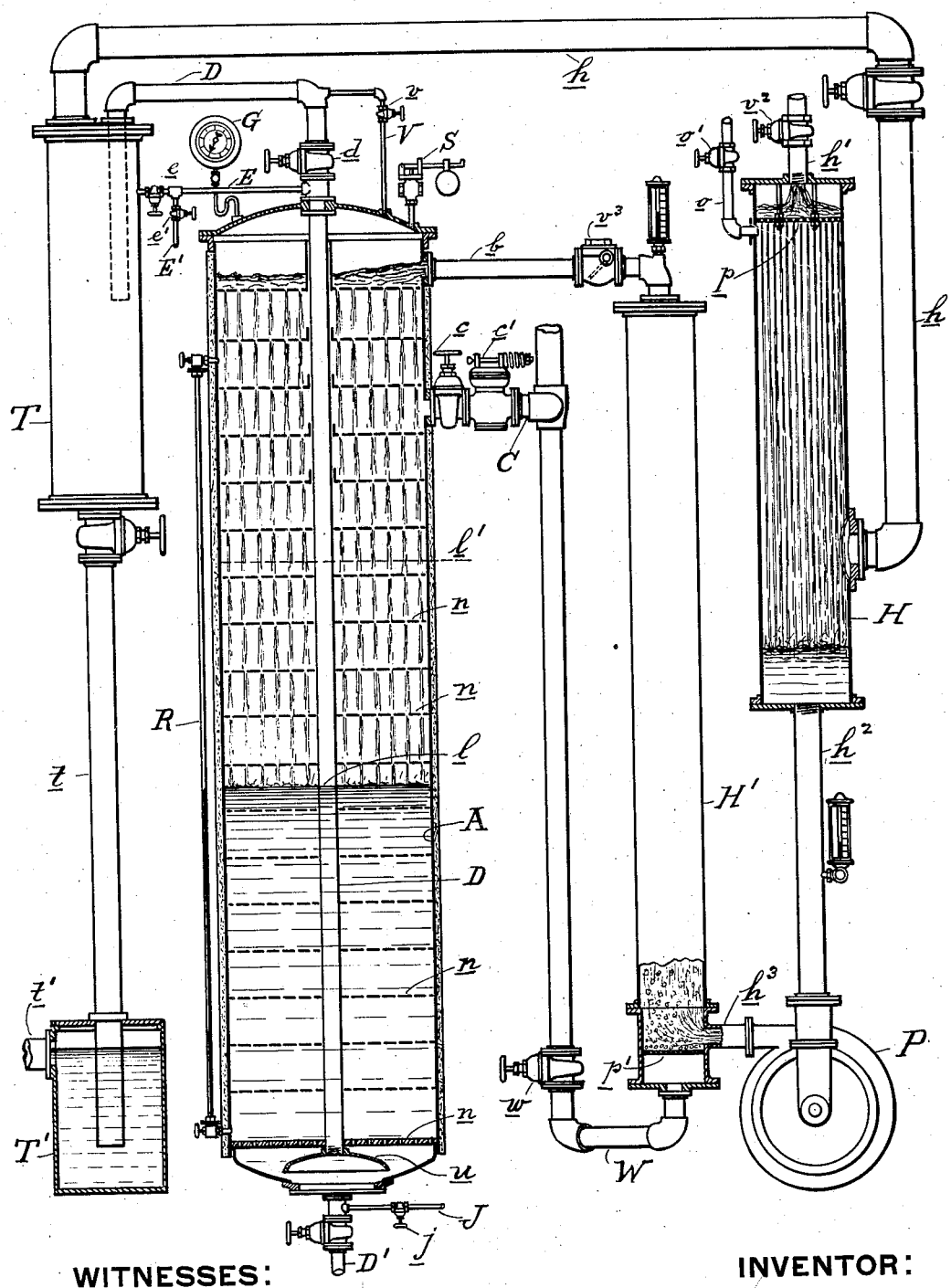
WITNESSES:
INVENTOR:

UNITED STATES PATENT OFFICE.

SAMUEL MORRIS LILLIE, OF PHILADELPHIA, PENNSYLVANIA.

PROCESS OF CONVERTING STARCH INTO DERIVATIVES, DEXTRIN, DEXTROSE, &c.

959,237.  Specification of Letters Patent.  Patented May 24, 1910.

Original application filed February 18, 1908, Serial No. 416,455. Divided and this application filed January 14, 1910. Serial No. 538,126.

REISSUED

*To all whom it may concern:*

Be it known that I, SAMUEL MORRIS LILLIE, a citizen of the United States, residing at Philadelphia, in the county of Philadelphia and State of Pennsylvania, have invented a new and useful Process of Converting Starch into Derivatives, Dextrin, Dextrose, &c., of which the following is a specification.

This application is a division of my application, Serial No. 416,455, filed February 18th, 1908.

The method usually employed for the conversion of starch into these derivatives is to nearly fill a closed vessel "converter" provided with a perforated steam heating coil with a mixture of starch, water and a small proportion of acid, heat the mixture under pressure by injected steam to the desired converting temperature, say 280° Fah., shut off the steam and allow the heated mixture to stand until the mass of the mixture has been converted to the desired degree as indicated by a reagent, usually a solution of iodin. A discharge valve is then opened and the contents of the converter discharged into a tank open to the atmosphere, the vapors due to the reduction in pressure passing away into the atmosphere. The converter is then recharged with the acid starch mixture and another conversion made. Each batch of converted liquor after leaving the converter is neutralized by a suitable reagent, as carbonate of soda, for example. The conversion of the starch progresses with the duration of its heated stay in the converter, which if long enough will carry it through the several conditions of starch paste, soluble starch, and dextrin to dextrose. The charge is kept in the converter until it has arrived at the desired degree of conversion. The portion of the charge first to leave the converter is less converted than the portion which leaves the converter last, for the latter is subjected to the heat as much longer than the former as it takes to empty the converter, and the two show with iodin quite different stages of conversion. This lack of uniformity in the conversion is one of the faults of this usual method of converting starch which it is the purpose of my invention to obviate. Another fault of this process is the intermittent demand for steam on the boilers. The converter makes a heavy demand while the charge is being heated to the converting temperature and then none at all until the next charge is heated.

The purpose of my invention is to provide a continuous process of converting starch by means of heat, acid and water into derivatives dextrin, dextrose, &c., and to obtain a practically uniform conversion, a constant draw of steam from the boilers, and other advantages incidental to a continuous process.

The process of treating the starch consists in mixing the starch with water and acid to form a mixture of the desired mobility and acidity in quantities sufficient to supply requirements; in forcing the said mixture of starch, water and acid continuously and at a uniform rate of flow, corresponding to the quantity of product wanted, through suitable heating devices and heating it therein under pressure to the desired converting temperature, say 280 degrees Fahr., making this heating period so brief that the starch mixture on leaving it will have suffered only a partial conversion; in delivering this but only partially converted heated mixture with an even distribution over the cross section of a column of the mixture, to which no more heat is added, moving uniformly through a containing vessel in which vessel the pressure is maintained not less than that corresponding to the converting temperature to which the mixture has been raised; in withdrawing from the end of the column the mixture at the same rate at which it is being delivered to the column at the opposite end, i. e., the uniform rate necessary to produce the desired quantity of product in a given time; in varying the length or depth of the said column of mixture to vary the length of time the liquors shall be subject to the converting temperature and thereby vary the degree of conversion; and finally in neutralizing the acid in the mixture by means of a suitable re-agent, approximately at the time it leaves the end of the column, or just prior to this.

For the better elucidation of my process I show in accompanying drawing an apparatus and describe the method of using it for practicing my process.

The vertical cylinder A is the "converting column" vessel. In it are contained a number of horizontal perforated diaphragms $n, n$, &c., of approximately the same diameter as the interior of the cylinder and equally spaced one above the other, the lowest diaphragm a little above the bottom of the cylinder, and the uppermost one a little below the top of the cylinder. A discharge pipe D, shown axial in the figure, extends from below the lowest diaphragm where it is fitted with the inverted cup $u$ up through them all and through the top of the cylinder and leads into an empty tank T, which has an outlet above through the pipe $h$, which leads into a spray condenser or heater H, hereinafter more fully described. Below, the tank T has a drain pipe $t$, which leads down into and nearly to the bottom of the sealing tank T'—which tank has an overflow pipe $t'$. The discharge pipe D is fitted with a suitable valve $d$. A pipe D' fitted with a valve leads from the bottom of the cylinder A and serves for draining the same if desired.

C is a steam pipe which opens into the cylinder below a number of the upper diaphragms, but above the level to which the converting column of liquor will in practice ever rise as hereinafter described. The pipe C is fitted with a hand-valve $c$ and also with a pressure reducing valve $c'$. The cylinder A is provided with safety valve S, pressure gage G, air vent pipe V, with valve $v$, leading into the pipe D beyond the valve $d$ and with provisions for indicating the height of liquor in the cylinder, such as the gage glass R on the side of the cylinder. A small test pipe E with valve $e$ leads from the discharge pipe D at a point below its valve $d$ into the tank T. Between its valve $e$ and the pipe D is a small branch pipe E' fitted with a valve $e'$ and opening into the atmosphere. A small pipe J, fitted with valve $j$, leads into the cylinder below the lower diaphragm in the same, and immediately under the inverted cup $u$ of the discharge pipe D.

The spray condenser, or heater H consists of a vertical cylinder, closed top and bottom, shown in vertical axial section in the drawing, containing a horizontal perforated plate $p$ near the top upon which delivers through the top of the heater the liquor conducting pipe $h'$ which is fitted with a hand valve $v^2$ and leads from a source of supply of the mixture of starch, water and acid which is to be treated in the apparatus being described. From the bottom of the heater H a pipe $h^2$ leads to the suction of a high pressure centrifugal pump P. Into the side of the heater a short distance above the bottom leads the pipe $h$, from the pressure reducing tank T. From the heater just below the perforated plate $p$ leads a vent pipe $o$ having a valve $o'$.

H' is a heater in which high pressure steam is used for heating purposes. It is a vertical cylinder closed top and bottom: It is shown in vertical section from the bottom for a short distance upward to disclose its internal construction. Through the bottom of the heater opens a live steam pipe W which is fitted with a hand valve $w$. In the heater a little above the bottom is a perforated horizontal plate $p'$ just above which there opens into the heater the pipe $h^3$, which connects to the discharge nozzle of the centrifugal pump P. From the top of the heater H', a discharge pipe $b$ leads into the converting column cylinder A above the upper diaphragm in the same. This pipe is fitted with a thermometer for indicating the temperature of the liquid flowing from the heater into the cylinder A and with a check valve $v^3$ which opens toward the cylinder A.

The mode of using this apparatus in the practicing of my process is as follows: Air is first driven from the system by opening the valves $d$, $v$, and $o'$ respectively in the pipe D, vent pipe V and vent pipe $o$, the latter of the heater H, and then admitting steam into the bottom of heater H' through the live steam pipe W by opening the valve $w$. When the pipes D, $v$, and $o$ grow hot due to escaping steam the air may be considered as expelled and the valves in the said pipes closed. The hand valve $c$ on the live steam line C to the converting column cylinder A is now opened, and the automatic pressure reducing valve $c'$ is set to maintain a steam pressure in the cylinder corresponding to the desired converting temperature say 280° Fahr., or a little above that. The safety valve S is set for a little above this pressure and the centrifugal pump P is started. The mixture of starch water and acid (mixed in proportions which are kept preferably practically constant) is now allowed to flow into the top of the heater H through the pipe $h'$, by opening the valve $v^2$, at a constant rate regulated by means of said valve—which will pass the wished for quantity of material through the system per unit of time. The starch liquor passes from the bottom of the heater H through the pipe $h^2$ into the centrifugal pump P, which delivers the liquor as fast as it comes through the pipe $h^3$ into the bottom of the heater H'. The centrifugal pump is so proportioned and is maintained at such a speed as will do this and deliver the liquor under such a pressure as will force it up through the heater H' into the converting column cylinder A against the pressure in the latter. As soon as the starch liquor begins to enter the bottom of heater H', live steam is turned into the bottom of the heater through the pipe W by means of the valve $w$ which is regulated so that the starch liquor passes from the top of the heater H' through the pipe $b$ and check valve $v^3$ into cylinder A at or a little below the converting temperature say 280° Fahr. which corresponds to about 35 pounds pressure above atmospheric. The heated acidulated starch liquor flows on to the upper perforated plate in the cylinder A at a constant speed, viz. that at which it is delivered into the heater H through the pipe $h'$. The heater $H'$ is so proportioned in size with respect to the normal flow of starch liquor that the latter will be in it only long enough to be converted partially, leaving a good part of the converting to be done in the cylinder A. If conditions are maintained constant as to rate of flow of the liquor and the quantity and pressure of steam delivered into the heater $H'$, the liquor will enter the cylinder A at a practically uniform state of conversion.

When, in putting the apparatus into service, as is now being described, the starch liquor enters the cylinder A at the top and it falls through the perforations from diaphragm to diaphragm until it reaches the bottom of the cylinder. In falling through the atmosphere of steam in cylinder A, it is brought to the desired temperature by the latter. The valve in the test branch pipe $E'$ is kept open. This permits the liquor to rise in the discharge pipe D as soon as its lower end is covered with the starch liquor. The discharge valve $d$ is kept closed, and the level of the liquor consequently rises in the cylinder to form the "converting column" of liquor. It is permitted to thus rise until the liquor flowing from the branch test pipe $E'$ shows by a proper testing reagent that the desired degree of conversion of the starch liquor has been reached. This indicates that the liquor at the bottom of the converter, or to be exact, at the top of the discharge pipe D has been subjected to the temperature long enough to effect the desired degree of conversion. The valve $d$ in the discharge pipe D is now opened sufficiently to maintain the level of the liquor where it was when the adequate reaction was obtained. If this be done, the liquor flowing from the pipe D will all have been in the converting column the same length of time, namely the time which was required to fill the cylinder up to the said level, say to the level $l$, and the liquor flowing out will be all of practically the same degree of conversion, that is assuming the rate of delivery of the starch liquor into the cylinder, and its acidity and also the temperature in the converting column to all remain constant. This latter will be the case so long as the liquor added to the column from above is of a constant temperature for no heat is added to the converting column nor any taken from it except such as may be lost by conduction through the walls of the cylinder which may be rendered *nil* by a suitable non-conducting covering around the surface of the cylinder.

The perforated diaphragms serve to evenly distribute the starch liquor over the surface of the converting column of liquor in the cylinder, to cause a uniform flow downward of the liquor from the top of the column to the outlet at the bottom of the same, and to prevent the agitation of the surface of the liquor to any considerable depth by the falling of the liquor upon the same. The perforated diaphragm that may be next above the surface of the liquor in the converting column breaks its fall, and the diaphragm next below the surface limits the said agitation to the liquor above it. The closer together the diaphragms are the more uniform will be the movement downward of the column of liquor throughout its entire cross section, the less will be the agitation of the liquor column at its surface and the less will be the danger of mixture of any portion of the moving converting column of liquor with the portions which next precede or next follow it in the column, something to be avoided in the interest of uniform conversion.

While the apparatus is in service the vent valve $v$ is left slightly open to permit of the escape of air and incondensable gases which might collect at the top of the converter cylinder A.

J is a pipe for delivering into the cylinder below the lower diaphragm in the converting column a solution of the re-agent (usually carbonate of soda) used for neutralizing the acid in the converted liquor. It is most convenient that this solution be of constant strength and be delivered into the converter at a constant speed. The solution thus delivered through the pipe J mixes with the acid liquor and passes with it up through the discharge pipe D, and into the tank T. The rate of inflow of the neutralizing solution is regulated by suitable means as by the hand valve $j$ so as to produce in the outflowing liquor the desired conditions with respect to neutrality. The liquor in the converting column is, with a view to quick conversion, preferably kept at a temperature considerably above 212° Fahr., say at 280° Fahr., and at the corresponding pressure of 35 pounds above atmospheric. The converted liquor on entering the tank T in which the pressure is lower, say atmospheric, flashes in part into vapor, which vapor escapes from the tank through the outlet pipe $h$, into the heater H in which it heats more or less the incoming cold starch liquor while the converted liquor escapes through the outlet $t$ into the sealing tank $T'$ and thence escapes by the overflow $t'$.

Neutralization of the acid in the converted liquor may be effected after the latter leaves the cylinder A, but in that case the escaping liquor and vapors are acid and are destructive to metal pipes and apparatus. For this reason I neutralize the acid while the liquor is still under pressure.

While the apparatus is in operation the valve e in the pipe E is kept slightly open so that there is always a flow of liquor through the pipe E from the discharge pipe D into the tank T. This permits samples being taken at any time from the branch test pipe E' which will exactly show, if tested, the degree of conversion of the discharging liquor.

Assuming constancy with respect to other conditions, namely acidity, rate of flow of liquor through the converting column, and temperature in the latter, the degree of conversion in the liquor issuing from the discharge pipe D will vary with the length or depth of the converting column of liquor in the cylinder. For example, if the surface of this column is caused to stand at the level $l$ and the conversion is right for the non-crystallizing product sold as "glucose," the conversion with the surface of the column held at some higher level $l'$ will be proper for the solid product sold as "grape sugar." The level of the surface of the liquor column may be raised by closing the valve $d$ in the discharge pipe D until the level is raised to the desired height by the inflowing liquor, and then opening the valve $d$ to the degree which makes the outflow of liquor equal to the inflow as indicated by the level remaining constant. The level of the liquor is lowered by opening wider the valve $d$ until the level falls to the point desired, and then closing the valve until the level remains constant. It is obvious that, maintaining a constant volume or height of converting column of liquor in the cylinder and a given temperature, the degree of conversion may be varied by increasing or lessening the rate of inflow of the acidified liquor through the converting column since they respectively lessen or increase the time the acid liquor is in the converting column and subject to its temperature.

The results obtained by my process contrasting with those obtained by the old intermittent method of converting starch, are the practically identical degree of conversion of every particle of the starch, the uniform draft on the steam supply and other advantages which usually attend a continuous process as contrasted with an intermittent process.

The apparatus shown in the drawing I purpose incorporating and claiming in other applications for Letters Patent.

I now claim as of my invention:

1. The process of converting starch into its derivatives, dextrin, glucose, etc., consisting in mixing the starch with water and acid to form a mixture suitably mobile and acid; in passing this mixture with a constant rate of flow through heating devices and heating it therein quickly to the desired converting temperature with only a partial conversion, if any; in passing the heated mixture as a uniformly moving column through a retaining vessel to complete the conversion desired by the heat stored in the mixture; in adjusting the time the mixture remains in the column so as to produce the degree of the conversion desired; and in adding the neutralizing agent continuously and in proper quantities to the liquor while still under the converting pressure and temperature and just prior to its release from same.

2. The process of converting starch into its derivatives dextrin, glucose, etc., consisting in mixing the starch with water and acid to form a mixture suitably mobile and acid; in passing this mixture with a constant rate of flow through heating devices and heating it therein quickly to the desired converting temperature, with only a partial conversion, if any; in passing the heated mixture as a uniformly moving column through a retaining vessel to complete the conversion desired by the heat stored in the mixture, and in adjusting the time the mixture remains in the column so as to produce the degree of conversion desired.

In testimony whereof I have signed my name to this specification in the presence of two subscribing witnesses.

S. MORRIS LILLIE.

Witnesses:
   JOHN J. WALTER,
   COLIN D. SMITH.